May 20, 1930.  E. THOMSON  1,759,767
LIQUID LEVEL GAUGE FOR BOILERS
Filed Jan. 14, 1926

Inventor:
Elihu Thomson,
by Alexander S. Lutz
Attorney.

Patented May 20, 1930

1,759,767

UNITED STATES PATENT OFFICE

ELIHU THOMSON, OF SWAMPSCOTT, MASSACHUSETTS, ASSIGNOR TO GENERAL ELECTRIC COMPANY, A CORPORATION OF NEW YORK

LIQUID-LEVER GAUGE FOR BOILERS

Application filed January 14, 1926. Serial No. 81,288.

The present invention relates to liquid level gauges for boilers and is especially well adapted for use with steam boilers in which the pressure is rather high, as is the tendency nowadays in the generation of steam. The invention is not necessarily limited thereto, however.

It is well known that in the working of such boilers having a water level gauge, the glass or other material of which the tube is constructed, generally a tube of hard glass, is subjected to the action of the hot steam which has a tendency to cause corrosion of the glass. This is due to the moisture in the steam caused by condensation which acts as a solvent.

The object of my invention is to provide an improved means for overcoming the above difficulty, and for a consideration of what is believed to be novel and the invention, attention is directed to the accompanying drawing, description thereof, and the appended claims.

Figure 1:
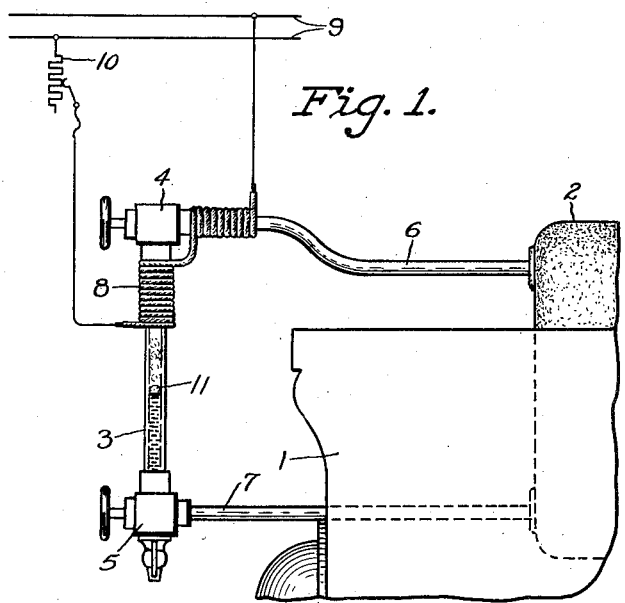
Figure 4:
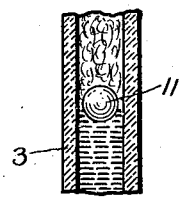
Figure 2:
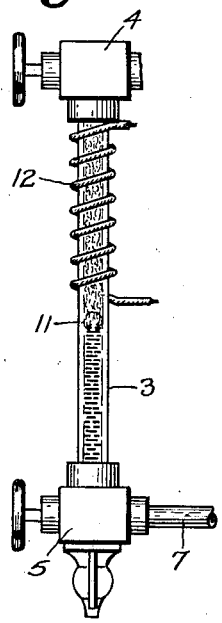
Figure 3:
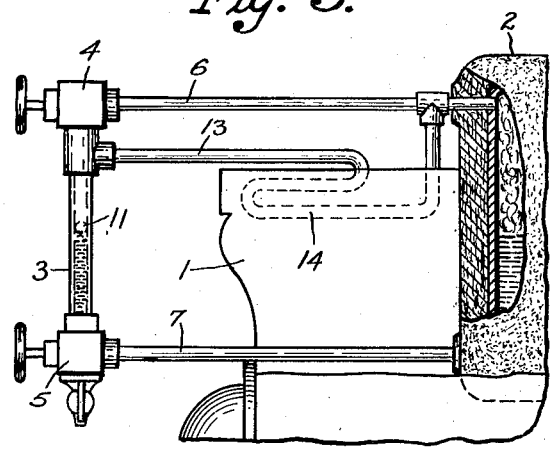

In the drawing, Fig. 1 is a side elevation of a boiler provided with a liquid level gauge embodying my invention; Fig. 2 is a detail view of a modification; Fig. 3 is a view similar to Fig. 1 of a modification, and Fig. 4 is a detail sectional view of a portion of a gauge glass.

According to my invention, I employ a gauge having a glass constructed from a suitable grade of glass material such as hard glass or fused quartz, and I provide in connection therewith a means for maintaining the temperature of the vapor in the gauge glass at a value such that the vapor is superheated. To this end I may provide a means for heating the upper portion of the gauge glass, that is, the portion occupied by the vapor, to a temperature such that the vapor therein is maintained at a temperature higher by some amount than the natural temperature of the vapor at the pressure involved. As a result, there will be in the gauge above the liquid level therein, a body of superheated vapor which cannot condense and which, therefore, is like a dry gas and is deprived of its solvent or corrosive action on the transparent tube itself. Distilled water acts as a rather powerful solvent especially at temperatures near the evaporation point. In the case of a hard glass tube the distilled water dissolves out alkalies in the glass, thus breaking down the structure of the glass, corroding the interior of said tube. In the case of fused quartz the hot distilled water dissolves certain of the silicates which are soluble acid salts and again corrodes the interior of the tube. The oscillation of the column of liquid in the gauge will be through a certain range, and, of course, at a small zone above the liquid column there will be saturated vapor at the temperature and pressure of the boiler. However, the corrosive action because of this will be of a very limited character. The heating means employed may be of any suitable character, such as a gas flame, an electric resistance coil, or a jacket heated by a suitable heating medium, such as superheated steam, for example.

Referring to the drawing, 1 indicates a portion of a furnace and 2 the end of a steam drum which contains water and steam at a certain level. Adjacent the steam drum 2 is a water level gauge comprising a gauge glass 3 and end pieces 4 and 5 which are connected to the steam drum by pipes 6 and 7. This arrangement is shown only by way of example and is to be taken as typical of any suitable structure.

According to the embodiment of the invention shown in Fig. 1, I provide in connection with the upper portion of glass 3 and the adjacent portion of pipe 6, a heating means in the form of an electrical resistance 8 which is wound around the glass and tube. It may be connected to any suitable source of electric current 9, the circuit comprising a suitable regulating means 10. By this means, the upper portion of the gauge may be heated after the manner already referred to above. If desired, I may provide in connection with the gauge a float 11 which rides on the liquid in the gauge and serves as a non-conducting heat barrier to separate the superheated zone in the gauge glass from the liquid zone. This float may be in the form of a hollow ball formed of suitable material, the space within the ball being filled with air which functions to make the float a good non-conductor for heat.

In Fig. 2 is shown an arrangement similar to that of Fig. 1 except that the turns of the resistance coil 12, corresponding to coil 8 of Fig. 1, are separated so that changes in water level may be seen beween the turns.

In Fig. 3 is shown a modification wherein the upper end piece 4, in addition to being connected to the boiler by pipe 6, is connected to it also by a pipe 13 which includes means whereby a section of it may be heated to superheat the steam in it. In the present instance it is shown as comprising a coil 14 located inside the furnace where it is subjected to the heating action of the flue gases, the arrangement being such that the steam in the coil is heated to a temperature higher than that in the boiler itself. This conduit, comprising pipe 13 and coil 14, forms a small superheater for the steam and causes a circulation of superheated steam through pipe 13 toward the gauge and back to the boiler through pipe 6. Pipe 13 is at a lower level than pipe 6 and since the superheated steam is expanded and is lighter than the steam in the boiler, the circulation will be effected by convection.

In accordance with the provision of the patent statutes, I have described the principle of operation of my invention, together with the apparatus which I now consider to represent the best embodiment thereof; but I desire to have it understood that the apparatus shown is only illustrative, and that the invention may be carried out by other means.

What I claim as new and desire to secure by Letters Patent of the United States is:—

1. The combination with a gauge glass for a boiler, of means for maintaining the temperature of the vapor in the upper portion of the glass at a value such that the vapor is superheated.

2. The combination with a boiler, of a gauge glass connected to it for indicating the liquid level in the boiler, and an electrical heating device associated with the gauge glass for maintaining the vapor in the gauge glass superheated.

3. The combination with a boiler, of a gauge glass connected to it for indicating the liquid level in the boiler, and an electric heating coil associated with the gauge glass for maintaining the vapor in the gauge glass superheated, the turns of said coil being spaced to afford readings of the water level through the coil.

In witness whereof, I have hereunto set my hand this 12th day of January, 1926.

ELIHU THOMSON.